April 28, 1936. E. L. SCHELLENS 2,038,763
HEAT INSULATING FOOD CONTAINER
Filed March 8, 1933 3 Sheets-Sheet 1

Inventor
Eugene L. Schellens
by Greenwood
atty

April 28, 1936.   E. L. SCHELLENS   2,038,763
HEAT INSULATING FOOD CONTAINER
Filed March 8, 1933   3 Sheets-Sheet 2
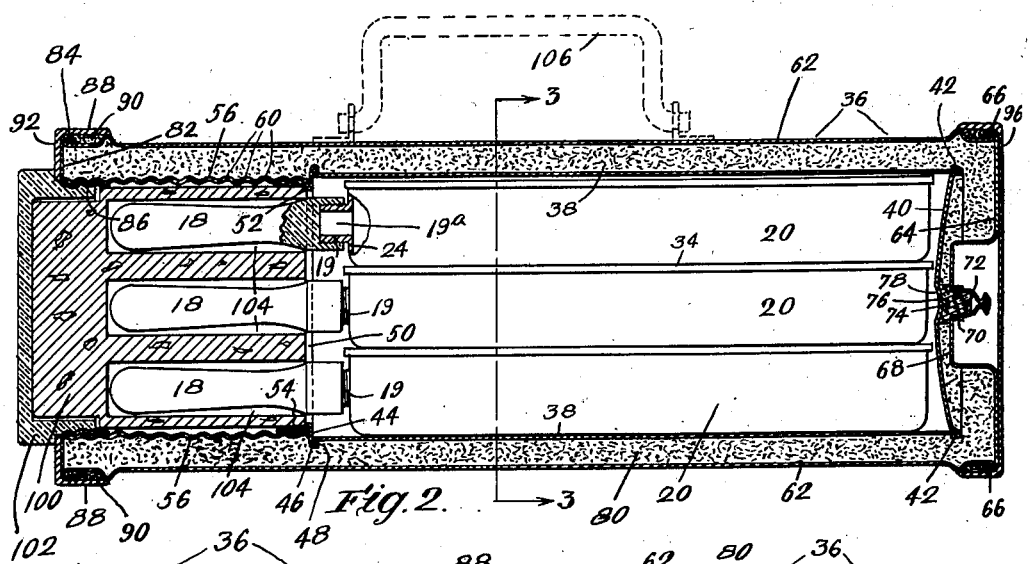
Fig. 2.
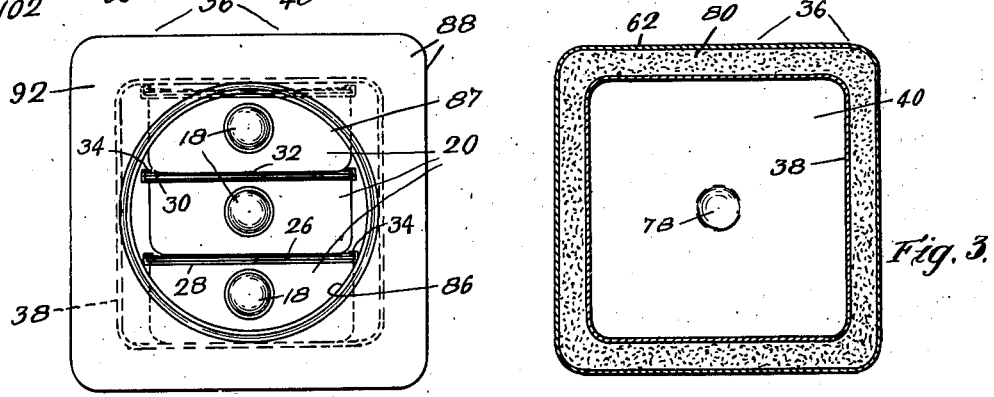
Fig. 3.
Fig. 4.
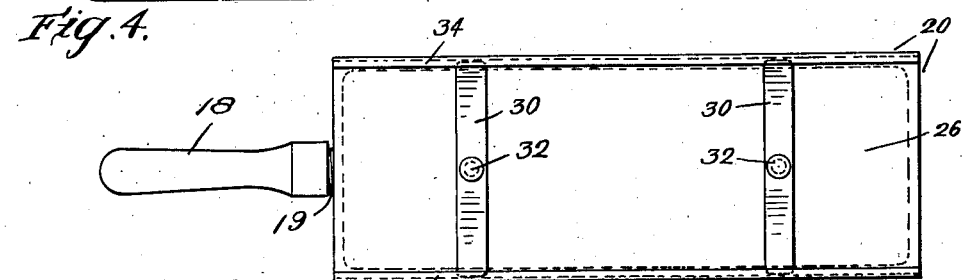
Fig. 5.
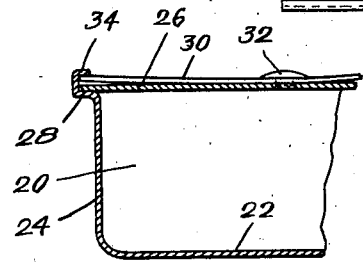
Fig. 6.
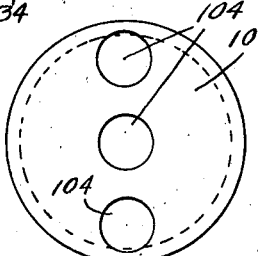
Fig. 7.
Inventor.
Eugene L. Schellens

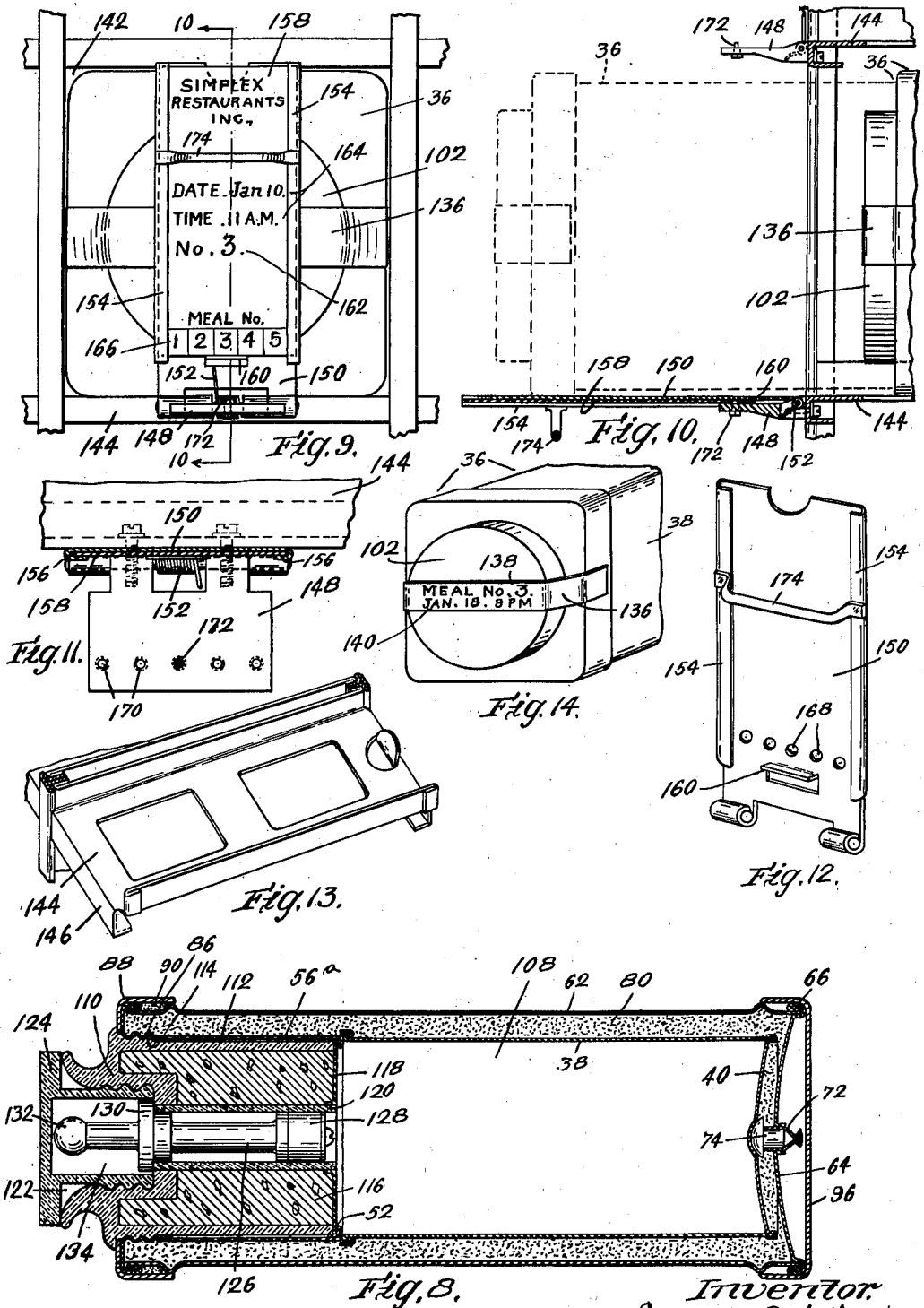

Patented Apr. 28, 1936

2,038,763

UNITED STATES PATENT OFFICE 2,038,763

HEAT-INSULATING FOOD CONTAINER

Eugene L. Schellens, Ridgewood, N. J., assignor to The Shellwood-Johnson Company, Paterson, N. J., a corporation of New Jersey Application March 8, 1933, Serial No. 660,073

4 Claims. (Cl. 220—9)

This invention relates to heat-insulating food containers.

In restaurant systems and especially systems where one organization operates several restaurants and especially those of the "quick service" type it is customary to prepare a large amount of the food sold at the restaurants at a central kitchen and to distribute the foods to the various restaurants where the hot foods are kept hot by the use of steam tables, until served to the customer. Due to the fact that the food is kept open at the steam table the food loses a large amount of the juices that carry the flavor of the food so that the food that is served to the customer is generally flat and more or less tasteless or at least does not have the full flavor present in food that is cooked in the home and served immediately after cooking. There is, furthermore, a marked loss in flavor in transporting the food from the central kitchen to the restaurants since the volatile flavor liquids escape from the loosely covered food containers in transport and since the hot foods become cool in transport and are then reheated at the steam tables. The cooling and subsequent reheating of the food ordinarily does not improve the flavor. Hence it is an object of this invention to provide a method and system of food distribution particularly adapted for hot foods, or those the temperature of which should be preserved, wherein the hot foods, and particularly individual portions of the foods are packed at the central kitchen in substantially tight receptacles when hot or at the proper temperature and the receptacles are stored in heat insulating containers and are transported in these containers to the restaurants and are kept at the restaurants in these containers until the food is served to the customer. In this way the flavor of the food is retained and the temperature of the food is maintained approximately constant up to the time it is served to the consumer.

It is common practice for restaurants to provide a certain variety of meals, say, four or five, each meal consisting of two or three different foods, usually a meat, potatoes and a vegetable, and the various meals comprising different food combinations. The present invention is particularly adapted for the distributing of such meals from a central kitchen to a plurality of restaurants and the dispensing thereof at the restaurants. In applying the present invention to the distribution, storage and ultimate dispensing of such meals my method is essentially as follows: The various foods are cooked or otherwise prepared at the central kitchen and individual portions of the foods are immediately prepared and placed in separate receptacles or covered trays, that may have been previously heated, which are immediately sealed to prevent the escape of volatile flavor essences. The filled receptacles are grouped, say, in three's to provide individual meals of the different foods and the foods in the receptacles of the various groups may be varied to provide several combinations of individual meals. The group of receptacles which contain the hot foods for a certain meal are placed in a heat-insulating container, preferably of the vacuum type, the container having some identifying mark as a number by which the nature of the combination of its contained foods can be ascertained readily. The heat-insulating container preserves the heat of the food therein for many hours. The various containers, containing different individual meals, are dispatched to the various restaurants and are placed on shelves in such manner that the identifying marks, and hence the nature of the contents thereof, can be ascertained readily by a customer. The containers are preferably stored on the shelves in groups each each containing the same meal and a menu is associated with the groups of containers so that a customer can select from the menu the particular meal that he favors and also ascertain the identification mark of the container that carries the meal. The customer then removes the selected container from the shelf and takes it to a table where he opens the container, withdraws the individual receptacles, placing the food therein on a plate or plates and there consumes it. Preferably the individual containers have checks or tickets associated therewith which the customer is required to present to the cashier for payment, the check identifying the nature and thereby the price of the meal and the arrangement being such that the check is punched or otherwise marked in the act of removing the container from the shelf, to prevent fraud. This method of food distribution has many advantages over the present system. The food is placed hot in the receptacles immediately it is prepared and sealed in the receptacles so that there is no harmful loss of flavor from the food. If desired certain foods can be placed hot but not entirely cooked in the receptacles and the cooking can be completed by the inherent heat stored in the food and the receptacles and present by the vacuum-insulated container. The heat-insulating containers preserve the heat of the food over a long period of time so that there is no loss of heat and thereby of flavor in transport. A large number of meals can be stored on shelves in a relatively small space so that more room is made available for the accommodation of customers. Less help is required in attending the wants of the customers. There is improved cleanliness and less wastage of food than heretofore. The customer has the assurance that the food has had a minimum exposure to contaminating influences.

My invention also comprehends a special form of food receptacle and a heat insulating storage container for a series of the trays and also apparatus for automatically punching a customer's ticket or check as a part of the act of removing a container from its storage shelf.

Fig. 2 is a sectional elevation of one of the heat-insulating food containers of Fig. 1.

Fig. 3 is a section taken along line 3—3 of Fig. 2.

Fig. 4 is a view of the open end of the container of Fig. 2.

Fig. 5 is a plan view of one of the food receptacles of Fig. 2.

Fig. 6 is a transverse sectional detail of the food container of Fig. 5.

Fig. 7 is an end view of the stopper of the container of Fig. 2.

Fig. 8 is a sectional view of a modified form of heat-insulating container.

Fig. 9 is a front elevation of one of the container compartments of the shelf structure of Fig. 1.

Fig. 10 is a sectional detail of the front end of a container compartment taken along line 10—10 of Fig. 9.

Fig. 11 is a plan detail of the punch shelf of the container compartment of Fig. 9.

Fig. 12 is a perspective view of the check or ticket holding and container supporting plate of Fig. 9.

Fig. 13 is a perspective detail of a container supporting shelf.

Fig. 14 is a perspective detail of an end of a container and illustrating particularly the method of sealing the container and identifying the contents thereof.

Figure 1:
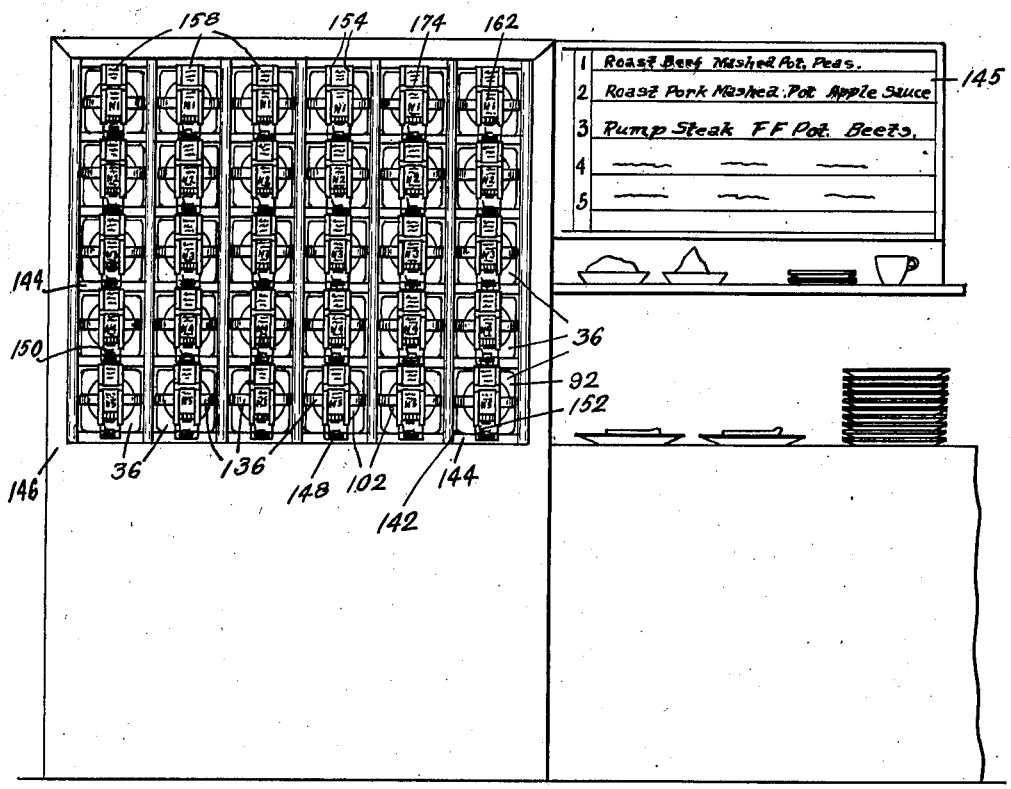
Fig. 1 is a front elevation of a storage shelf containing a number of food containing receptacles forming a part of the present invention.
Figures 15, 16:
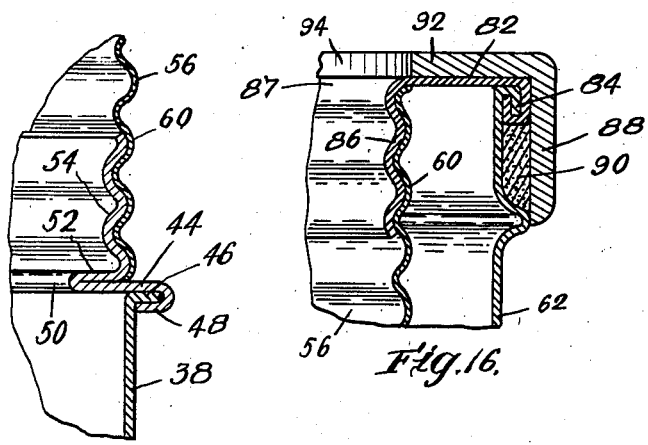
Fig. 15 is a sectional detail illustrating the nature of the connections between the inner wall and the neck of the heat insulating container of Fig. 2.
Fig. 16 is a sectional detail illustrating the connections between the top portions of the outer and inner walls of the container of Fig. 2.

In accordance with the present invention individual portions of food that are hot or are at some temperature that should be preserved for rendering them most palatable for consumption, are placed in individual receptacles 20, see Figs. 2, 4, 5 and 6, at the central kitchen. Each food containing receptacle is approximately rectangular in cross-section and is relatively long and narrow so that it can be accommodated in the evacuated heat-insulating container presently to be described and has a flat bottom wall 22 and upstanding side walls 24 and is of suitable volume to contain an individual portion of food. The receptacle is widely open at the top and is closed by a cover comprising a generally flat plate 26 which is seated upon an outstanding peripherally continuous flange 28 of the side walls and is held releasably upon said flange and in practically liquid and vapor tight engagement therewith by leaf springs 30 which are swivelled on rivets 32 of the cover and have their ends located removably under the upper flanges 34 of the receptacle and in channels of which the aforesaid flanges 28 comprise a part. The container is provided with a handle 18 which is extended in the longitudinal line of the container and is secured to an end wall thereof as by being screw-threaded removably onto a neck 19 of said end wall. Said neck can have a passage 19a therethrough as illustrated in Fig. 2 which communicates with the interior of the receptacle and said handle 18 may constitute a closure for said passage. Thus the contents of the container, if liquid, can be poured out of the passage 19a after the handle is removed.

Figure 17:
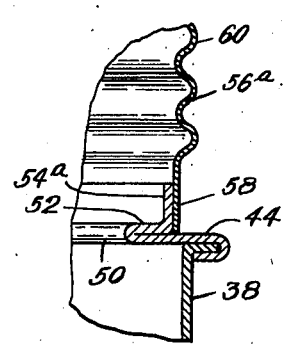
Fig. 17 is a sectional detail similar to Figs. 15 and 16 but illustrating a modified form of connection between the neck and the inner wall.

A number, say, three, receptacles are stored in contiguous relation within a heat-insulating container 36, as illustrated in Fig. 2. Said container is of the vacuum insulated type and has an inner thin metal shell 38 that is substantially rectangular in cross section, as is illustrated in Figs. 3 and 4, and has cross sectional dimensions suited to receive its designated number of food containing receptacles with but little clearance. Said inner shell is provided with a thin metal bottom wall 40 which preferably is dished inwardly to resist the pressure differences on opposite sides thereof and has a channeled periphery 42 in which the bottom end of the inner shell 38 is received. A rectangular end or cover plate 44 is seated upon the top of the inner shell and the edges of the plate and are locked together in any suitable manner and, as here shown, the top of the shell is provided with an outstanding flange 46 and the outer edge of the plate 44 has its outer edge portion 48 reflexed under the flange. The plate 44 is provided with a central circular opening 50 of as large dimensions as is practicable, the diameter of the opening being approximately as large as the cross sectional dimension of the interior of the inner shell, and large enough to admit of the passage of the food receptacles therethrough and the stacking of the receptacles one on top of the other within the inner shell. The top plate 44 is provided with a seat 52 which surrounds the opening 50 and also is provided with an upstanding ring or flange 54 which preferably is integral with the plate 44 and also preferably is screw-threaded, the threads being rolled in the ring. The inner shell is provided with a relatively long neck 56 which is preferably screw-threaded on the ring 54 and has its bottom edge seated against the top face of the plate 44. The neck, however, need not be in screw-threaded engagement with said ring, it being sufficient to have the neck in close contact with the ring, and Fig. 17 illustrates a construction where the ring 54a is free from screw-threads and is smooth and the neck 56a has a smooth lower part 58 that is seated upon the top plate 44 and closely surrounds the smooth neck 54a. The neck 56 is preferably relatively long and is composed of thin material so that it offers a high resistance to the flow of heat along its length. Preferably the neck is screw-threaded throughout the major portion of its length or has corrugations 60 transverse the length thereof so as to provide an increased length of metal through which heat must flow from the interior of the container to an exposed dissipating surface thereby to enhance the insulating properties of the container. The container also includes an outer shell 62 that is of rectangular cross section and is spaced from and has its flat surfaces parallel with the flat surfaces of the inner shell. The outer shell also is constructed of metal. The open bottom end of the outer shell is closed by a bottom closure plate 64 of generally rectangular configuration having a double interlocking connection 66 between its marginal portions and the end portion of the shell 62. The bottom closure 64 is provided with an inset wall 68 that has a neck 70 in which an exhaust tube 72 is located. A porous plug, as a carbon plug, 74 is seated in said tube and upon the wall 68 and has its end in engagement with the bottom wall of the inner shell and so shaped as to center the inner shell in the outer shell and to hold the inner shell against lateral movement. As here shown the plug 74 has a concave inner end 76 and the bottom wall 40 of the inner shell has a convex protuberance 78 that is seated in said convexity. Preferably although not necessarily, the space between the inner and outer shells is filled with a loose heat-insulating material 80 of any suitable nature; as loose asbestos fibres, diatomaceous earth, which is packed rather solidly in the space and so supports the inner shell against displacement within the outer shell and also supports the shells against distortion due to the evacuated space and to impacts. The space between the shells is evacuated by connecting a vacuum pump to the exhaust pipe 72, the air in the space between the shells passing through the pores in the porous plug 74 and the plug holding back the particles of the insulating material. The container is conveniently sealed off from the pump by crushing the tube together and then soldering the end of the tube. The open top of the outer shell is covered by a rectangular plate 82 which is seated upon the top and has its marginal portion folded over the edge portion of the side wall to form a double interlocking connection 84 therebetween. The cover plate 82 has preferably integrally therewith an annular outstanding ring or flange 86 which defines an opening 87 in said plate, and said ring is internally and externally screw-threaded and is screw-threaded into the top of the neck 56 and thereby, through said neck, connects the top of the inner shell with the top of the outer shell. After the various parts of the container are secured together in a vacuum tight manner the top of the container is provided with a reinforcing cap 88 which snugly surrounds the end of the outer shell and is secured thereto by a body of cement 90 or other means and has a top plate 92 that overlies the top plate 82 and has a circular opening 94 therein which is aligned with and is larger than the internal diameter of the neck 56. The bottom end of the container is similarly provided with a cap 96 that overlies the bottom wall 64 and the bottom end of the shell and is similarly cemented in place. Said caps are composed of substantially thicker material than the container, or are more resistant to deformation, and serve to support the container against deformation and injury due to impacts thereon.

The precise manner in which the shells and the associated parts are connected together is not herein of extreme importance, it being sufficient to have the parts mechanically interconnected so that they will remain in their proper relation to each other while the container is treated to render it vacuum tight. The connections between the parts are not in themselves intended to be vacuum tight and any joint that is convenient and will permit the parts to be assembled easily is satisfactory.

The container is made vacuum tight preferably by the process described and claimed in my copending application Serial No. 626,384, filed July 30, 1932. In accordance with the process described in said application, small pieces of a material that has a lower melting point than the material of the container and will alloy with the container material is placed in contact with the container at the joints between the various parts. Copper is a good material for bonding the joints together and sealing all crevices, pores and passages through which leakage might occur. The container with pieces or particles of bonding material in contact therewith at the joints and other necessary parts is placed in a furnace provided with a reducing atmosphere, as hydrogen, carbon monoxide, and the like, and the container is heated at least to the melting point of the bonding material. The bonding material melts and flows over the surfaces of the container parts and enters all crevices, passages and pores by its affinity for the container material and alloys with the container material and, when the container is withdrawn from the furnace and cooled to the solidifying point of the bonding material, not only forms a vacuum tight seal for the joints and other passages through the walls but also bonds the closely associated parts strongly together. The bonding material can be laid in small pieces on the surfaces of the container near the parts to be covered with the molten bonding material or the bonding material in powder form can be distributed upon the necessary parts of the container. Preferably the entire surface of the container is bonded in the above described manner. This can be done conveniently by spraying upon the surface a liquid comprising the bonding material in powder form contained in a binder having a readily evaporating solvent. The binder can be a nitrocellulose in a suitable solvent therefor. A solution of nitrocellulose containing copper particles or powder can be sprayed onto all surfaces of the evacuated container either before the assembly of the parts thereof, so that the copper deposit is present in the various connections between the parts or it can be sprayed on after the parts have been assembled. The nitrocellulose binder disappears in the reducing furnace without any resultant deterioration in the action of the bonding material and any binder for the powdered bonding material should be one that does not leave a deposit or harmfully impair the action of the bonding material. As has been stated preferably the entire surface of the container is treated to have thereon a thin film of the bonding material, as copper, which is alloyed with the material. The inner surface of the inner shell and the outer surface of the outer shell are preferably chromium plated after the bonding operation and the plated surfaces are thereafter polished to have high reflecting power so as to hinder the loss of heat from the contents of the container. In lieu of chromium plating any plating material can be used which is capable of receiving a high polish. Chromium plating is especially desirable in connection with the present container not only because of its resistance to tarnish and its properties as a reflector but also because it is well adapted for plating upon the copper alloy surface provided by the bonding process.

The open neck of the container is closed by a cork plug 100 or a plug of other material having low heat absorbing and conducting properties, which plug is seated upon the ledge 52 at the bottom of the neck 56 and is held with some pressure against the neck by a removable cap 102 which bears against the plug and is screw-threaded removably into the screw-threaded ring 86. Said plug is provided with longitudinally extended passages or chambers 104, see especially Figs. 2 and 7, which separately receive the handles 18 of the containers and thereby insulate the containers from the neck 56.

While the container above described is particularly adapted for use in the distribution of individual portions of food at restaurants it can also be used for distributing food to homes, offices and the like, and in this case may be conveniently provided with a handle 106 so that it can be carried readily. When the container is used for restaurant service, however, the handle is not necessary.

For the storage and distribution of hot and cold liquids a modified form of container illustrated in Fig. 8 is convenient. The vacuum insulated container 108 is constructed essentially in the manner described above except that in this modification the neck 56a instead of being corrugated or screw-threaded throughout its length is plain. The stopper 110 comprises a cylindrical shell 112 having screw threads 114 at its upper end which engage with the screw threads of the ring 86 to secure the stopper in the container. The space within the shell 112 is occupied with an insulating body 116 as cork or the like and the stopper has secured thereto on its inner end a metal disc 118 that is seated on the ledge 52 and has a highly polished bottom face. A tube 120 composed of glass or other heat-insulating material is located axially within the stopper 110 and in the insulating body 116 and is open at its inner end to the interior of the container and at its outer end to a recess 122 in the top wall of the stopper, the recess being screw-threaded and normally closed by a removable screw-threaded plug 124. The passage through the tube 120 is normally closed by a removable closure member comprising a stem 126 having an enlarged lower end or piston 128 that closely engages the inner face of the tube 120 and seals it against passage of liquid therethrough. The stem is provided at its upper end with an outstanding flange 130 that overlies the end of the tube and holds the piston 128 removably positioned in the lower end of the tube. The stem is provided at its upper end with a knob or handle grip 132 that is located in a chamber 134 of the plug 124. This construction of closure member holds the piston 128 at the inner end of the stopper 110 and thus provides a long length of insulating stem 126 and glass tube 120 to oppose conduction of heat through the stopper. Liquids can be poured out of the tube by removing the plug 124 and the closure member. Access to the interior of the container for the removal or introduction of solid matter can be gained by unscrewing the stopper.

In accordance with this invention the evacuated containers as above described are loaded at the central kitchen with receptacles 20 containing individual portions of food. Each container for instance can receive three receptacles which contain different individual portions of food which make up an individual meal. If desired the food can be placed in the receptacles while hot but before it is completely cooked and allowed to finish its cooking in the receptacles within the evacuated containers. Each container with its loaded receptacles is sealed preferably shortly after it is loaded so that the customer by an inspection of the unbroken seal has assurance that the container has not been tampered with after loading. The seal, for instance, can comprise a label 136, see especially Fig. 14, which is applied across the cap 102 or other closure member of the container and has its end affixed to the side wall thereof. The label preferably has an identification mark 138 which, when compared with a menu having the components of the various meals listed and identified by similar identification marks, gives the customer information as to the nature of the contents of the container. The seal is adapted to be broken by the customer before the closure can be removed and the food receptacles withdrawn. Preferably also the seal bears other data 140 such as the day and the time of loading of the container so that the customer can be assured that he is getting fresh food of proper temperature. The packed containers are received at the restaurants and are placed in individual compartments 142 or on shelves 144 of a display cabinet 146 located against a wall of the restaurant or in other positions convenient to access by the customer. Preferably the containers having the same character of meals are grouped together for convenience of the customers. Containers having meal #1, for instance, can occupy the top row of shelves, containers having meal #2 can occupy the next lower line of shelves, and so on. The customer is expected to select the meal he desires from a menu 145 displayed conveniently to the containers and ascertain therefrom the number of the meal and then remove from a compartment a container identified by the selected number and carry it to a table where he can remove and eat the contents.

It is also an object of this invention to provide such an arrangement that the customer must punch a check or ticket which identifies the meal during the act of removing the selected container from its compartment or prior to the complete removal thereof, which ticket the customer is expected to present to the cashier for payment. To this end each shelf 144, see especially Figs. 9 through 13, is provided with a transverse front wall 146 which is located below the top face of the shelf and has a forwardly extended bracket plate 148 secured thereto. A compartment cover plate or barrier 150 is hinged to said bracket plate and is normally held in upright position over the open end of the compartment and against the wall of the next upper shelf by a coil spring 152. The opposite long edge portions 154 of the cover plate are reflexed inwardly toward each other and over the body of the plate to provide opposed channels 156 in which a paper slip 158 constituting a check or ticket is removably received, the bottom edge of the check resting upon a lip 160 of the plate. The check preferably bears an identification mark 162, as the number of the meal, contained in the container behind it, together with other data 164 indicative of the date and time packed. The check also bears a series of meal numbers 166, the number corresponding to the number 162 of which must be punched out by the customer to indicate that he has actually withdrawn the container having the corresponding meal and has not substituted the check of a meal that might be cheaper in price. To effect the punching out of the meal number by the customer, the plate 150 is provided with a series of punch apertures 168 each of which is positioned in register with a separate meal number 166. The bracket plate 148 is provided with a plurality of screw-threaded punch holes 170 which are positioned in line with the punch aperture 168 and a punch member 172, see Figs. 9 and 10, can be screw-threaded into a hole 170, the position of which corresponds to the number of the meal contained in the associated container. The plate 150 is provided with a handle 174 which the customer can grasp to pull the plate down upon the bracket plate 148 to permit the withdrawal of the container and the act of positioning the plate 150 upon the bracket plate 148, which is necessary to effect the withdrawal of the container, automatically punches the check. The checks for the different meals preferably are differently colored, or are in some way differently distinguished, so as to indicate readily a check that has been substituted for one in a row of differently colored or identified checks, and thereby deter the substitution of a check for a cheap meal for one of a more expensive meal.

With the above described method and apparatus for vending foods it will be apparent that the food can be prepared at the central kitchen in the most appetizing manner and that the flavor of the food and its temperature will be retained during the distribution of the containers to the restaurants and the storage thereof in readiness for use so that the customer is assured of full flavored food that is served hot or at the proper temperature and has had the minimum of contact with contaminating influences. The dating and timing of the containers also is an assurance of freshness and proper temperature and if the customer is especially desirous of having hot foods he can select a container the time mark on which indicates that it was packed but shortly before his selection thereof. The amount of help required in a restaurant employing the present system can be reduced materially since no help is required in the dispensing of the meals. Increased cleanliness of the restaurants is also obtained.

In the claims, reference to a food container is intended to include a food container for foods the temperature of which is to be preserved, whether hot or cold.

I claim:

1. A heat-insulating food container having outer and inner spaced shells providing an evacuated heat-insulating space between them, the inner shell being rectangular in cross-section and having a long open neck that is circular in cross-section, a plurality of food-containing trays adapted to enter said inner shell through the circular neck thereof and be stored collectively thereon, said trays having handles that are located in and extend longitudinally of said neck, and a closure for the opening of said neck.

2. A heat-insulating food container having outer and inner spaced shells providing an evacuated heat-insulating space between them, the inner shell being rectangular in cross-section and having a long open neck that is circular in cross-section, a plurality of food-containing trays adapted to enter said inner shell through the circular neck thereof and be stored collectively thereon, said trays having handles that are located in and extend longitudinally of said neck, and a heat-insulating closure for said neck having individual chambers in which said handles are separately located.

3. A heat-insulating food container having outer and inner spaced shells providing an evacuated heat-insulating space between them, the inner shell having a long open neck, a plurality of food-containing trays adapted to enter said inner shell through said neck and be stored collectively therein and having a combined cross-section closely conformed with that of said inner shell, said trays having handles that are located in and extend longitudinally of said neck, and a closure for said neck.

4. A heat-insulating food container having longitudinal outer and inner spaced-apart shells providing a heat-insulating chamber between them, said inner shell being elongated and substantially rectangular in cross-section and having at one end a longitudinal neck the opening through which is substantially of the full width of the body of the inner shell, a set of two or more elongated food-containing trays having collectively a combined cross-section conforming generally to that of the container space and adapted to enter said inner shell longitudinally through such wide neck opening thereof and to be stored collectively in the container space within the rectangular body of said inner shell and each tray extending substantially the full length of such container space, but only a fraction of its width, said trays havng withdrawal means accessible through said neck for removing them from the container, and a closure for the opening of said neck.

EUGENE L. SCHELLENS.